Patented Oct. 25, 1938

2,134,543

UNITED STATES PATENT OFFICE 2,134,543

VANADIUM OXIDE CATALYST

Chester E. Andrews, Overbrook, Pa., assignor to Röhm & Haas Company, Philadelphia, Pa.

No Drawing. Application June 9, 1937, Serial No. 147,181

8 Claims. (Cl. 23—234)

This invention relates to the preparation of metal oxide catalysts, particularly vanadium oxide catalysts, for use in vapor phase catalytic oxidation reactions. More particularly it resides in the use of quaternary ammonium salts of vanadium pentoxide for coating catalyst carriers.

Heretofore, vanadium pentoxide catalysts have been prepared by depositing ammonium metavanadate on an inert carrier and igniting to convert the deposit to vanadium pentoxide. This method is unsatisfactory because of the poorly adherent coating obtained and the necessity of having to repeat the process numerous times to build up a uniform coat of sufficient thickness. Subsequently, it was proposed to use as the coating material solutions of metallo-organic complexes formed from vanadium compounds and organic acids. These solutions when evaporated are quite sticky and deposit a heavy coating of the organic complex which when ignited leaves the carrier uniformly coated with a porous layer of vanadium oxide.

It has now been found that vanadic acid with quaternary ammonium bases forms salts that are extremely soluble in water and form viscous, sticky solutions from which an excellent coating can be deposited on an inert carrier. By igniting the coating a porous, strongly adherent, uniform layer of vanadium pentoxide is obtained.

The vanadium solution can be prepared by heating either ammonium metavanadate or vanadium pentoxide with an aqueous solution of the quaternary ammonium base. When the ammonium salt is used, the ammonia is displaced by the quaternary base and expelled from the solution on heating. A slight excess of the base is preferably used to hasten the solution. When applied to carriers, such as grained aluminum, which are attacked by strong bases, this excess is neutralized before the coating is applied.

Any of the carriers known to the art may be used, but smooth surfaced materials such as fused quartz and alundum are difficult to coat and the coating when obtained is less adherent than with porous carriers. Porous carriers or those having etched surfaces are therefore preferred. As suitable carriers may be mentioned pumice, the porous silica sold under the trade name "Filtros", quartz, alundum, graphite, "Alundum filter plate", silica gel, activated alumina, and grained aluminum.

In general the catalyst is prepared by breaking the carrier to the desired size, adding it to a solution of the quaternary ammonium base and heating to evaporate the water. As the water evaporates, the solution becomes syrupy and sticky and coats the carrier well. Heating is then continued to drive off all the water and then to decompose the organic compound. The decomposition occurs at a fairly low temperature (150–250° C.) but carbon is deposited and there may be some reduction of the vanadium to lower oxides. The catalyst is then heated to 350–450° C. in a stream of air, which burns out the carbon and any remaining organic material, and converts the vanadium to vanadium pentoxide. The finished catalyst has a yellow to orange-brown color. Some fines of vanadium oxide are obtained which may be screened out, redissolved, and used again for coating catalysts. If the first coating is not uniform, the catalyst may be recoated by repeating the operation.

An alternative method of coating is to heat the carrier and spray the solution of the quaternary ammonium vanadate onto the carrier particles while stirring them to present fresh surfaces to the spray. It is also possible to prepare a satisfactory catalyst by evaporating the solution of quaternary ammonium vanadate to a syrupy consistence, adding and mixing in finely ground particles of an inert diluent, heating to decompose the vanadate, and breaking the resulting mass to the desired size of particles.

The quaternary ammonium bases as a class are strongly alkaline materials and any of them may be used in the present process. For economical reasons those most easily prepared such as the tetramethyl and trimethyl benzyl compounds are preferred. Others such as the dimethyl benzyl cetyl, the trimethyl lauryl, the trimethyl methallyl and diethyl benzyl cetyl are as equally useful.

To illustrate the method of preparing the catalyst the following examples are given—

*Example 1.*—1.5 kilograms of C. P. ammonium metavanadate was dissolved in 5.3 liters of a 38.6% aqueous solution of trimethyl benzyl ammonium hydroxide by gentle heating. 15 kilograms of 12 to 20 mesh Filtros particles was added and the mixture heated while stirring continuously. As the water evaporated the mass became thick and sticky and finally black due to the decomposition of the organic material. The individual particles separated as completely coated particles. 15.8 kilograms of catalyst stayed on a 28 mesh screen and .39 kg. passed through. The material on the screen was heated at 400° C. in a stream of air until its color became an orange-brown. The final catalyst contained approximately 0.8 kilogram of vanadium pentoxide uniformly distributed as a porous coating over the Filtros particles. It gave very good yields of maleic acid in the oxidation of benzene.

*Example 2.*—1.2 kilograms of ammonium metavanadate was dissolved in 10.25 kilograms of 10% tetramethyl ammonium hydroxide, and the solution heated to boiling to drive out the ammonia. 6.25 kilograms of 12 to 20 mesh Filtros was added and the mixture heated with stirring until the water was evaporated, the organic material decomposed and the orange color of vanadium pentoxide was obtained.

*Example 3.*—2 kilograms of finely ground fused vanadium pentoxide was dissolved in 11.8 liters of 38.6% trimethyl benzyl ammonium hydroxide by heating to boiling. The excess base was then neutralized with 50% acetic acid, and 18.3 kilograms of 12 to 20 mesh grained aluminum added. The solution was then evaporated to dryness and decomposed as in the previous examples. 19.6 kilograms of catalyst that was held on a 28 mesh screen was obtained. This catalyst was recoated with a solution of 1 kilogram of vanadium pentoxide in 5.9 liters of 38.6% trimethyl benzyl ammonium hydroxide, the excess base being neutralized with acetic acid as before. On decomposition of the organic material and ignition 2 kilograms of catalyst that was held on a 28 mesh screen was obtained.

*Example 4.*—2.5 kilograms of C. P. ammonium metavanadate was dissolved in 6 liters of 2.5 N-trimethyl benzyl ammonium hydroxide and the solution heated to boiling to drive out the ammonia. 8.9 kilograms of 12 to 20 mesh graphite was added and the solution evaporated, the organic material decomposed and the catalyst ignited at 400° C. in a stream of air as in the previous examples. It was recoated two more times in the same way and finally heated at 400° C. in a stream of air for 20 hours. The finished catalyst weighed 12.6 kilograms and was uniformly covered with brownish yellow vanadium pentoxide.

Thus far the invention has been described as specific to vanadium oxide catalysts for it is with that material that it will be most widely used. It is as equally applicable, however, to the preparation of catalysts from other acidic oxides such as the higher oxides of chromium, molybdenum, uranium, manganese, and tungsten or mixtures of these oxides with each other or with vanadium oxide. As an example, mixtures of vanadium pentoxide and molybdic oxide may be dissolved in trimethyl benzyl ammonium hydroxide and the resulting solution evaporated on an inert carrier and decomposed to the oxides as in the previous examples. Such catalysts have particular value as oxidizing catalysts, and by varying the proportion of vanadium and molybdenum the activity may be varied to suit the particular use for which it is intended. A very intimate mixture of the oxides is obtained by this method.

In general the invention can be said to be applicable to the metals of Groups Va, VIa, and VIIa, of the periodic arrangement of the elements.

I claim:

1. The process of forming a catalyst for organic oxidation reactions which comprises forming a quaternary ammonium salt of an acid of a metal of Groups Va, VIa, and VIIa of the periodic table, mixing a carrier with an aqueous solution of said quaternary ammonium salt, drying the mixture, and decomposing the quaternary ammonium salt to deposit a layer of catalytic metal oxide on the carrier.

2. The process of forming a catalyst for organic oxidation reactions which comprises mixing a carrier with an aqueous solution of a quaternary ammonium salt of vanadium pentoxide, drying the mixture and decomposing the quaternary ammonium salt to deposit a layer of vanadium pentoxide on the carrier.

3. The process of forming a catalyst for organic oxidation reactions which comprises forming a quaternary ammonium salt of an acid of a metal of Groups Va, VIa, and VIIa of the periodic table, coating a carrier with a solution of said quaternary ammonium salt, drying the coating, and igniting to decompose the quaternary ammonium salt and deposit a layer of catalytic metal oxide on the carrier.

4. The process of forming a catalyst for organic oxidation reactions which comprises coating a carrier with a solution of a quaternary ammonium salt of vanadium pentoxide, drying the coating, and igniting, to decompose the quaternary ammonium salt and deposit a layer of vanadium pentoxide on the carrier.

5. In the process of coating carriers with a layer of catalytic metal oxide of a metal of Groups Va, VIa, and VIIa of the periodic table, the improvement which comprises applying to the carrier a solution of a quaternary ammonium salt of said oxide, drying, and igniting to decompose the quaternary ammonium radical.

6. In the process of coating carriers with a layer of vanadium pentoxide the improvement which comprises applying to the carrier a solution of a quaternary ammonium metavanadate, drying, and igniting to decompose the quaternary ammonium radical.

7. In the process of coating carriers with a layer of catalytic metal oxide of a metal of Groups Va, VIa, and VIIa of the periodic table the improvement which comprises applying to the carrier a solution of a trimethyl benzyl ammonium salt of said oxide, drying, and igniting to decompose the trimethyl benzyl ammonium radical.

8. In the process of coating carriers with a layer of vanadium pentoxide the improvement which comprises applying to the carrier a solution of a trimethyl benzyl ammonium metavanadate, drying, and igniting to decompose the trimethyl benzyl ammonium radical.

CHESTER E. ANDREWS.